US008045518B2

United States Patent
Kuo

(10) Patent No.: US 8,045,518 B2
(45) Date of Patent: Oct. 25, 2011

(54) METHOD OF DEACTIVATING HIGH-SPEED DOWNLINK OPERATION IN CELL_FACH STATE FOR A WIRELESS COMMUNICATIONS SYSTEM AND RELATED APPARATUS

(75) Inventor: Richard Lee-Chee Kuo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 774 days.

(21) Appl. No.: 12/050,935

(22) Filed: Mar. 18, 2008

(65) Prior Publication Data

US 2008/0233950 A1     Sep. 25, 2008

Related U.S. Application Data

(60) Provisional application No. 60/896,500, filed on Mar. 23, 2007.

(51) Int. Cl.
*H04W 4/00* (2009.01)
*H04W 24/00* (2009.01)
*H04B 7/216* (2006.01)

(52) U.S. Cl. ......... 370/329; 370/335; 455/424; 455/425

(58) Field of Classification Search .................. None
See application file for complete search history.

(56) References Cited

U.S. PATENT DOCUMENTS

| 2003/0095519 A1* | 5/2003 | Kuo et al. ................. 370/338 |
| 2005/0070252 A1 | 3/2005 | Farnsworth |

FOREIGN PATENT DOCUMENTS

| EP | 1 519 595 A1 | 3/2005 |
| EP | 1 699 253 A2 | 9/2006 |
| KR | 20030004945 A | 1/2003 |
| KR | 1020040049189 A | 6/2004 |
| KR | 1020050095615 A | 9/2005 |
| KR | 1020060109808 A | 10/2006 |
| KR | 1020080075447 A | 8/2008 |
| KR | 1020080075449 A | 8/2008 |
| WO | 2006111785 A1 | 10/2006 |

OTHER PUBLICATIONS

R2-070405 3GPP TSG-RAN WG2 Meeting #56bis, "Stage 2 updates for Enhanced CELL_FACH state in FDD", Jan. 2007.
R2-071164 3GPP TSG-RAN WG2 Meeting #57bis, "Introduction of Enhanced CELL_FACH state 25.331", Mar. 2007. 3GPP TS 25.331 V7.3.0 (Dec. 2006) Radio Resource Control (RRC); Protocol Specification (Release 7), p. 181-182 (Section 8.3.1.9).
Nokia, L2 architecture and UE operation for Enhanced CELL_FACH state, 3GPP TSG-RAN WG2 Meeting #56-bis, R2-070069, Sorrento, Italy, Jan. 15, 2007.
Nokia,Siemens:"Introduction of Enhanced CELL_FACH state", Feb. 12-16, 2007, 3GPP TSG-2 Meeting #57, R2-071012, XP050134005, St. Louis, USA.
Notice of Allowance on related foreign application (KR1020080026556) from KIPO dated Nov. 30, 2010.
3GPP TSG-2 Meeting #57, St. Julian's, Malta, Mar. 26-30, 2007 (R2-071556).

* cited by examiner

*Primary Examiner* — Chirag Shah
*Assistant Examiner* — Srinivasa Reddivalam
(74) *Attorney, Agent, or Firm* — Klein, O'Neill & Singh, LLP

(57) ABSTRACT

To avoid degrading the packet transmission performance, a method for improving a determining procedure of stopping a high speed downlink operation corresponding to a CELL_FACH state for a user equipment, also called UE, in the CELL_FACH state in a wireless communications system is provided. The method includes changing a setting of a dedicated variable corresponding to a dedicated HS-DSCH radio network transaction identifier, hereinafter called H-RNTI, from a use state to a close state; and determining that the setting of the dedicated variable and a setting of a common variable corresponding to a common H-RNTI are valid configuration if the setting of the common variable is a close state.

8 Claims, 3 Drawing Sheets

METHOD OF DEACTIVATING HIGH-SPEED DOWNLINK OPERATION IN CELL_FACH STATE FOR A WIRELESS COMMUNICATIONS SYSTEM AND RELATED APPARATUS

CROSS REFERENCE TO RELATED APPLICATIONS

This application claims the benefit of U.S. Provisional Application No. 60/896,500, filed on Mar. 23, 2007 and entitled "Method and Apparatus for Improving HS-DSCH Reception when CCCH is mapped on HS-DSCH in a Wireless Communication System", the contents of which are incorporated herein by reference.

BACKGROUND OF THE INVENTION

1. Field of the Invention

The present invention relates to a method for improving a high speed downlink operation corresponding to a CELL_FACH state for a wireless communications system and related communications device, and more particularly to a method for improving a determining procedure of stopping a high speed downlink operation corresponding to a CELL_FACH state for a UE in the CELL_FACH state for a wireless communications system and related communications device.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting at the third generation mobile telecommunication technology, the 3rd Generation Partnership Project (3GPP) provides High Speed Package Access (HSPA) technology, which includes High Speed Downlink Package Access (HSDPA) and High Speed Uplink Package Access (HSUPA), to increase bandwidth utility rate and package data processing efficiency to improve uplink/downlink transmission rate.

On the basis of HSDPA, the 3GPP further introduces HS-DSCH reception in a CELL_FACH state allowing the UE in the CELL_FACH state to monitor a High Speed Downlink Shared Channel (HS-DSCH) accompanied with a Shared Control Channel for HS-DSCH (HS-SCCH) for downlink data reception, so as to improve a peak data rate, a signaling delay, a state transition delay, download times and flexible cell capacity.

A UMTS radio access network (UTRAN) enables the HS-DSCH reception in the CELL_FACH state by including parameters, related to radio resource control (RRC) configuration of HS-SCCH, HS-DSCH and a common HS-DSCH radio network transaction identifier (common H-RNTI), in the system information broadcast. For the UE in an idle mode, the parameters are configured in a "Downlink HS-PDSCH system information" information element (IE) included in a system information block (SIB) type 5/5bis. For the UE in an RRC connection mode, the parameters are configured in a "Downlink HS-PDSCH system information for connected mode" IE included in an SIB type 6.

The UE may use a common or a dedicated H-RNTI to perform the HS-DSCH reception in the CELL_FACH state. The common and dedicated H-RNTIs are both used as an identity of the UE so that the UE can receive its own packets. Furthermore, the common H-RNTI can be shared by multiple UEs, whereas each dedicated H-RNTI is only allocated to one UE. During reception of media access control (MAC) packets, the UE using the common H-RNTI needs to determine whether the received packets belong to it via UE identification information (i.e. UE ID and UE ID Type) in the packet header. On the other hand, the MAC packets for the UE using the dedicated H-RNTI include no UE identification information to provide better data transmission efficiency.

The UE selects a suitable common H-RNTI to use from the common H-RNTI parameter. On the other hand, if the UTRAN attempts to allocate a dedicated H-RNTI to the UE, the UTRAN sends a related configuration through RRC procedures, such as an RRC connection or a cell update procedure, and the UE stores the configuration in an H-RNTI variable. Each time the HS-DSCH reception in the CELL_FACH state is enabled, the UE uses the dedicated H-RNTI if the H-RNTI variable is set; otherwise the UE uses the common H-RNTI.

The UE has an HS_DSCH_RECEPTION_CELL_FACH_STATE and an HS_DSCH_RECEPTION_OF_CCCH variable revealing a use state of the dedicated and common H-RNTIs, respectively. When the HS_DSCH_RECEPTION_CELL_FACH_STATE variable is set to "TRUE", the UE receives packets mapped to a Dedicated Traffic Channel (DTCH) and a Dedicated Control Channel (DCCH) according to the dedicated H-RNTI. When the HS_DSCH_RECEPTION_OF_CCCH variable is set to "TRUE", the UE receives packets mapped to a Common Control Channel (CCCH) according to the common H-RNTI. If both of the variables are set to "FALSE", this means that the HS-DSCH reception in the CELL_FACH state is deactivated.

According to the RRC specification, the UE has to perform a variable determining procedure to activate or deactivate the HS-DSCH reception in the CELL_FACH state. For applying the HS-DSCH reception in the CELL_FACH state, the following conditions must be met: (1) the UE is in the CELL_FACH state; (2) the variable H-RNTI is set; (3) the SIB type 6 is defined and includes the "Downlink HS-PDSCH system information for connected mode" IE or the SIB type 5/5bis includes the "Downlink HS-PDSCH system information for connected mode" IE. If all the conditions are met, the variable HS_DSCH_RECEPTION_CELL_FACH_STATE is set to "TRUE" for starting HS-DSCH reception in low layers (the MAC and physical layer).

If any of the above conditions is not met and the HS_DSCH_RECEPTION_CELL_FACH_STATE variable is set to "TRUE", the UE sets the variable to "FALSE". In addition, if the UE is in the CELL_FACH state and the HS_DSCH_RECEPTION_OF_CCCH variable is set to "FALSE", the UE stops the HS-DSCH reception and sets an INVALID_CONFIGURATION variable to "TRUE", which means that the settings of the HS_DSCH_RECEPTION_CELL_FACH_STATE and HS_DSCH_RECEPTION_OF_CCCH variables are considered an invalid RRC configuration. In this situation, the UE may disconnect the RRC connection and enter the idle mode.

As can be deduced from the above, the situation causing the UE in the CELL_FACH state to change the HS_DSCH_RECEPTION_CELL_FACH_STATE variable from "TRUE" to "FALSE" is either the variable H-RNTI is cleared or the SIBs type 5/5bis and type 6 do not indicate the support of HS-DSCH reception in the CELL_FACH state.

The UE may initiate the cell update procedure during the HS-DSCH reception in the CELL_FACH state, and the cause to initiate the cell update procedure may be cell reselection, periodical cell update, a radio link failure, an RLC unrecoverable error or uplink data transmission. The UE also initiates a URA update procedure when performing UTRAN registration area reselection (URA Reselection) or periodical URA update.

When the UE initiates the cell/URA update procedure due to cell/URA reselection and the selected cell/URA supports the HS-DSCH reception in the CELL_FACH state, the H-RNTI variable storing the dedicated H-RNTI is cleared, and the HS_DSCH_RECEPTION_OF_CCCH variable is set to "TRUE" for the UE to perform the HS-DSCH reception with the common H-RNTI.

If the selected cell/URA does not support the HS-DSCH reception in the CELL_FACH state, neither the SIB type 6 includes the "Downlink HS-PDSCH system information for connected mode" IE nor does the SIB type 5/5bis include the "Downlink HS-PDSCH system information for connected mode" IE. As a result, the HS_DSCH_RECEPTION_CELL_FACH_STATE variable changes from "TRUE" to "FALSE". In this situation, the INVALID_CONFIGURATION variable is set to "TRUE" through the abovementioned variable determining procedure if the HS_DSCH_RECEPTION_OF_CCCH variable is set to "FALSE". However, the settings of the HS_DSCH_RECEPTION_OF-CCCH and HS_DSCH_RECEPTION_CELL_FACH_STATE variables, which can be used for configuring the UE to perform a non-high speed downlink operation, should not be considered illegitimate in the above case. Furthermore, setting the INVALID_CONFIGURATION variable to "TRUE" configures the UE to disconnect the RRC connection, thereby resulting in repeated reconnections for packet reception. Thus, the variable determining procedure of the prior art degrades packet transmission performance.

SUMMARY OF THE INVENTION

The present invention therefore provides a method for a UE in the CELL_FACH state of a wireless communications system and related communications device for improving a determining procedure of stopping a high speed downlink operation including the HS-DSCH reception in the CELL_FACH state to avoid degrading the packet transmission performance.

The present invention discloses a method for improving a determining procedure of stopping a high speed downlink operation corresponding to a CELL_FACH state for a UE in the CELL_FACH state in a wireless communications system. The method includes changing a setting of a dedicated variable corresponding to a dedicated H-RNTI from a use state to a close state; and determining that the setting of the dedicated variable and a setting of a common variable corresponding to a common H-RNTI are valid configuration if the setting of the common variable is a close state.

The present invention further discloses a communications device in a CELL_FACH state of a wireless communications system for improving a determining procedure of stopping a high speed downlink operation corresponding to the CELL_FACH state to avoid degrading the packet transmission performance. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes changing a setting of a dedicated variable corresponding to a dedicated H-RNTI from a use state to a close state; and determining that the setting of the dedicated variable and a setting of a common variable corresponding to a common H-RNTI are valid configuration if the setting of the common variable is a close state.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
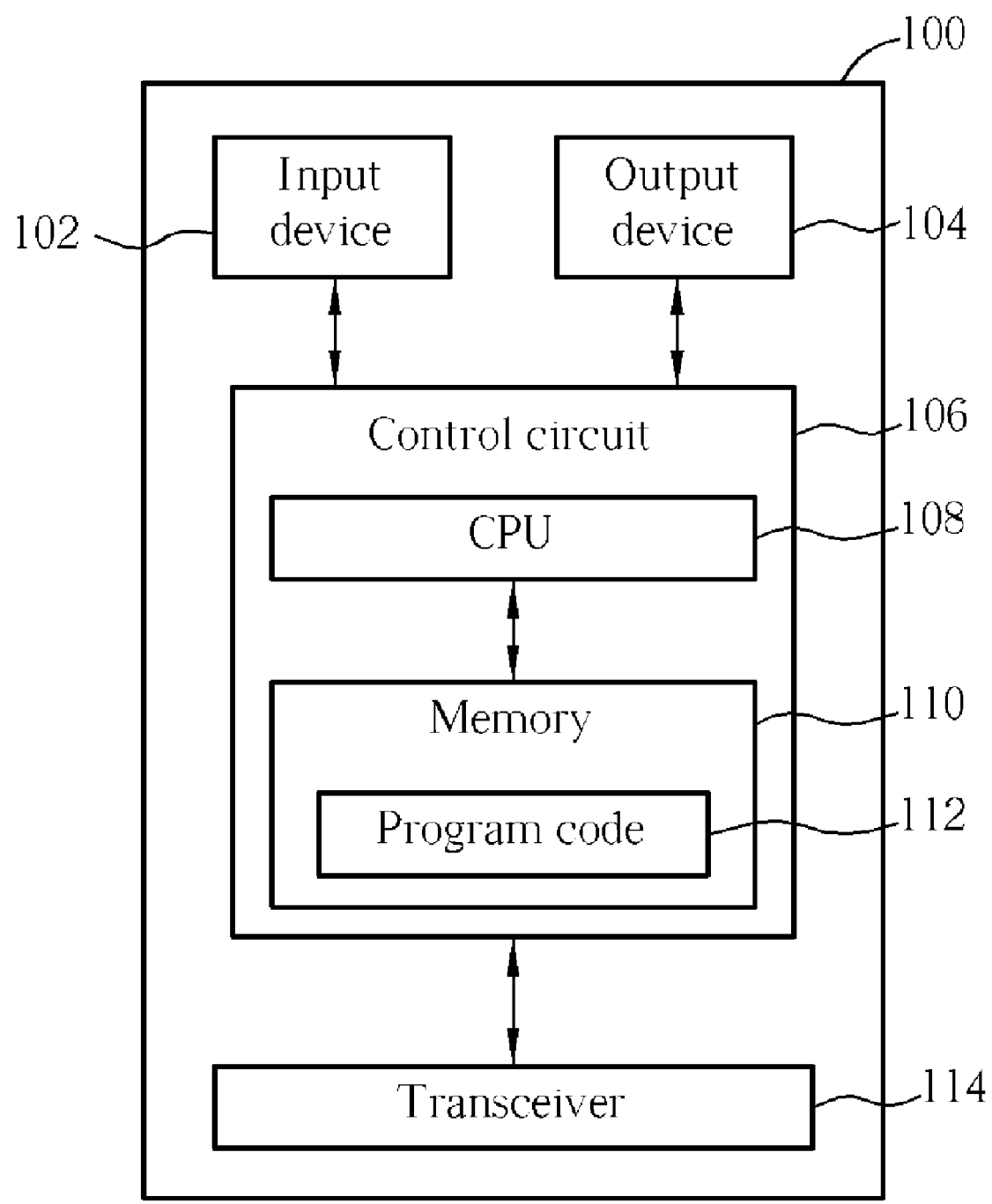
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a HSPA system of a third generation (3G) mobile communications system and supports a high speed downlink operation corresponding to a CELL_FACH state. The high speed downlink operation includes HS-DSCH reception in the CELL_FACH state.

Figure 2:
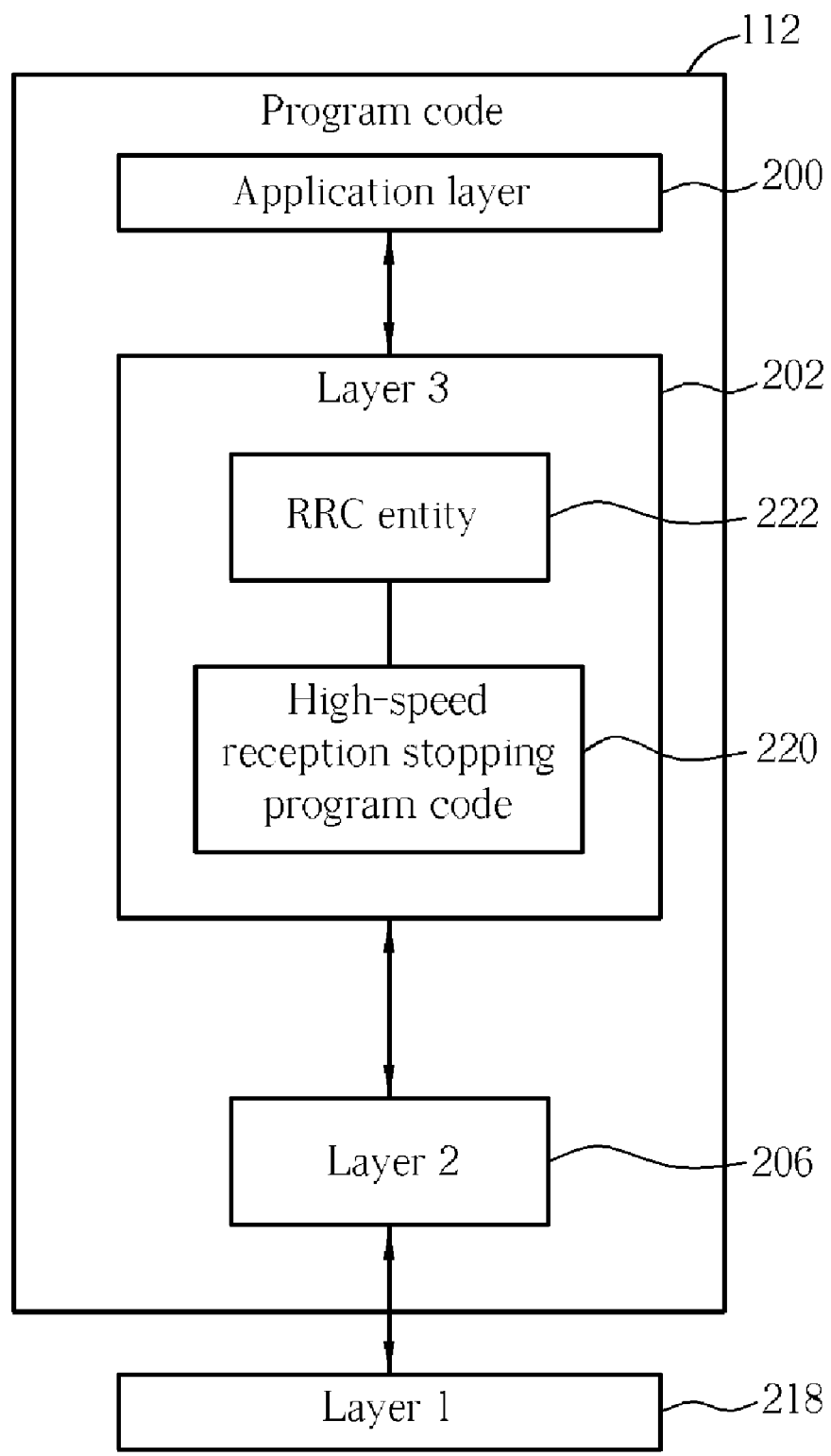
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 3 202 includes a radio resource control (RRC) entity 222 for controlling the Layer 1 218 and the Layer 2 206 and performing peer-to-peer communication with a network terminal, such as a Node-B or a UTRAN. In addition, the RRC entity 222 can switch the communications device 100 among the idle mode, CELL_PCH, URA_PCH, CELL_FACH and CELL_DCH states.

Figure 3:
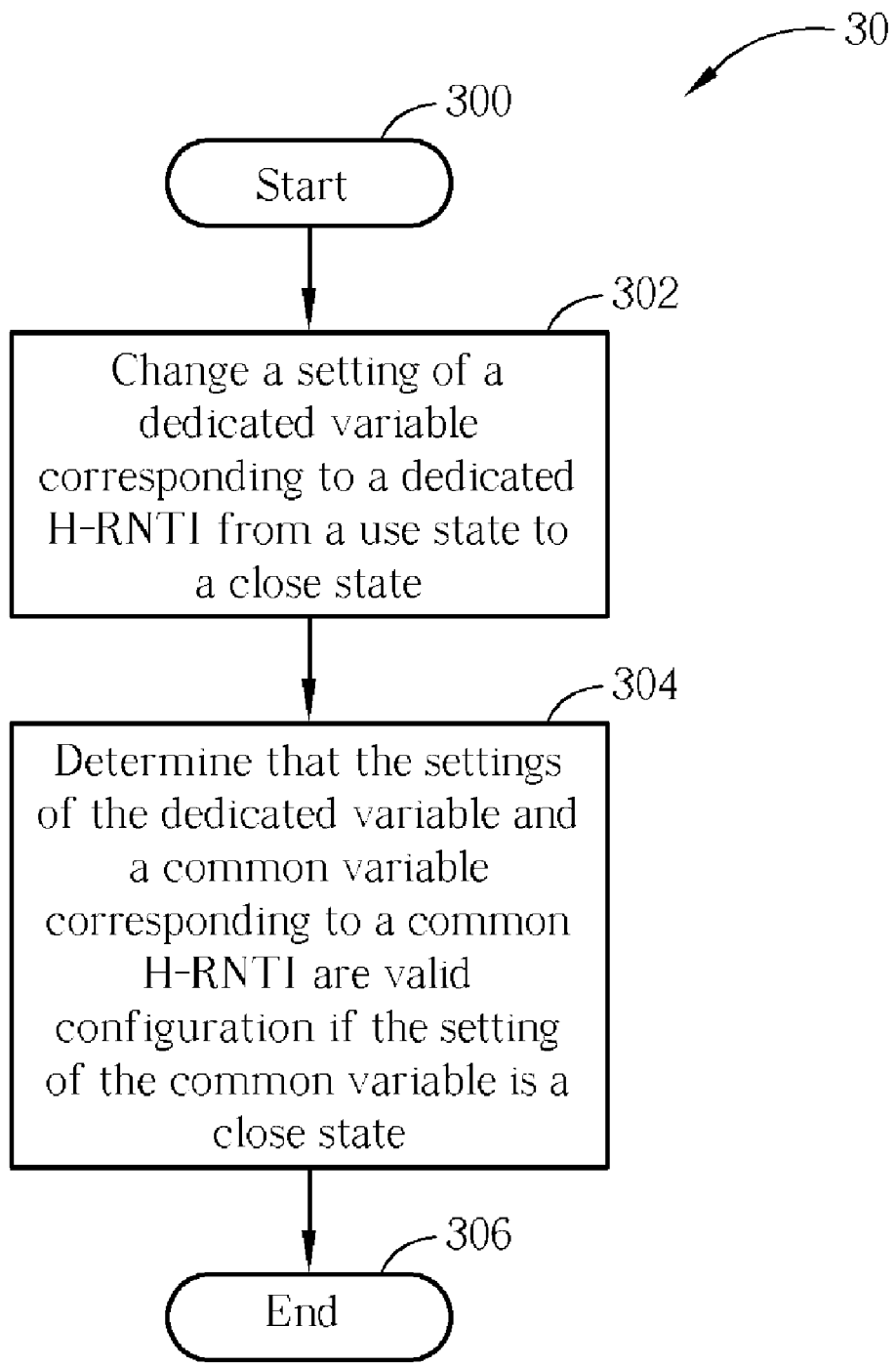
FIG. 3 is a flowchart diagram of a process according to an embodiment of the present invention.

When the following conditions are met: (1) the communications device 100 is in the CELL_FACH state; (2) a variable H_RNTI is set; (3) a received SIB type 6 is defined and includes the "Downlink HS-PDSCH system information for connected mode" IE or a received SIB type 5/5bis includes the "Downlink HS-PDSCH system information for connected mode" IE, the communications device 100 uses a dedicated H-RNTI for the HS-DSCH reception in the CELL_FACH state by setting an HS_DSCH_RECEPTION_CELL_FACH_STATE variable to "TRUE". In this situation, the embodiment of the present invention provides a high-speed reception stopping program code 220 in the program code 112 to correctly perform operations related to stopping the HS-DSCH reception in the CELL_FACH state, so as to avoid degrading the packet transmission performance. Please refer to FIG. 3, which illustrates a schematic diagram of a process 30 according to an embodiment of the present invention. The process 30 is utilized to improve a determining procedure for stopping the high speed downlink operation for a UE in the CELL_FACH state of a wireless communications system, and can be compiled into the high-speed reception stopping program code 220. The process 30 includes the following steps:

Step 300: Start.

Step 302: Change a setting of a dedicated variable corresponding to a dedicated H-RNTI from a use state to a close state.

Step 304: Determine that the settings of the dedicated variable and a common variable corresponding to a common H-RNTI are valid configuration if the setting of the common variable is a close state.

Step 306: End.

According to the process 30, the UE determines the common variable when the setting of dedicated variable is changed from the use to the close state. The UE then determines the settings of the dedicated and common variables are valid RRC configuration if the setting of the common variable is the close state. In other words, the UE does not consider the settings of the variables invalid but only stops the high speed downlink operation if the setting of the common variable is the close state when the setting of dedicated variable is changed from the use to the close state. Therefore, the UE can maintain the RRC connection.

Preferably, the dedicated variable is a HS_DSCH_RECEPTION_CELL_FACH_STATE variable, and the common variable is a HS_DSCH_RECEPTION_OF_CCCH variable. In this situation, the UE determines the HS_DSCH_RECEPTION_OF_CCCH variable when the setting of the HS_DSCH_RECEPTION_CELL_FACH_STATE variable is changed from "TRUE" to "FALSE" during the determining procedure. If the setting of the HS_DSCH_RECEPTION_OF_CCCH variable is "FALSE", the UE maintains a setting of an INVALID_CONFIGURATION variable "FALSE" and also stops operations related to the HS-DSCH reception in the CELL_FACH state in low layers (the Layer 1 218 and the Layer 2 206). Preferably, the operations in the low layers are stopped by stopping reception of HS-DSCH and HS-SCCH, clearing the H-RNTI variable, resetting entities of the low layers and releasing related resources.

Therefore, through the process 30, the UE only stops the HS-DSCH reception in the CELL_FACH state and does not set the INVALID_CONFIGURATION variable to "TRUE" when the UE reselects a new serving cell/URA without support of the HS-DSCH reception in the CELL_FACH state.

In conclusion, the embodiment of the present invention ensures that the UE can directly switch to use non-high-speed downlink operation without an RRC reconnection after the completion of the determining procedure, thereby avoiding degradation of the packet transmission performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for improving a determining procedure of stopping a high speed downlink operation corresponding to a CELL_FACH state for a user equipment, also called UE, in the CELL_FACH state in a wireless communications system, the method comprising:

changing a setting of a dedicated variable corresponding to a dedicated HS-DSCH radio network transaction identifier, hereinafter called H-RNTI, from a use state to a close state; and determining that the setting of the dedicated variable and a setting of a common variable corresponding to a common H-RNTI are valid configuration if both the setting of the dedicated variable is a close state and the setting of the common variable is a close state, wherein determining that the setting of the dedicated variable and the setting of the common variable are valid configuration if both the setting of the dedicated variable is a close state and the setting of the common variable is the close state is determining that a setting of an HS DSCH RECEPTION CELL FACH STATE variable and a setting of an HS DSCH RECEPTION OF CCCH variable are valid configuration if both a setting of the HS DSCH RECEPTION CELL FACH STATE variable is "FALSE" and a setting of the HS DSCH RECEPTION OF CCCH variable is "FALSE" and wherein determining that the setting of the dedicated variable and the setting of the common variable are the valid configuration comprises maintaining a setting of an INVALID CONFIGURATION variable "FALSE".

2. The method of claim 1 further comprising stopping the high speed downlink operation when the setting of the dedicated variable changes from the use state to the close state and the setting of the common variable is the close state.

3. The method of claim 1, wherein the high speed downlink operation comprises reception of a high speed downlink shared channel, abbreviated to HS-DSCH.

4. The method of claim 1, wherein changing the setting of the dedicated variable from the use state to the close state is changing a setting of an HS_DSCH_RECEPTION_CELL_FACH_STATE variable from "TRUE" to "FALSE".

5. A communications device in a CELL_FACH state of a wireless communications system for improving a determining procedure of stopping a high speed downlink operation corresponding to the CELL_FACH state to avoid degrading the packet transmission performance, the communications device comprising:

a control circuit for realizing functions of the communications device;

a central processing unit coupled to the control circuit for executing a program code to operate the control circuit; and a memory coupled to the central processing unit for storing the program code;

wherein the program code comprises:

changing a setting of a dedicated variable corresponding to a dedicated HS-DSCH radio network transaction identifier, hereinafter called H-RNTI, from a use state to a close state; and determining that the setting of the dedicated variable and a setting of a common variable corresponding to a common H-RNTI are valid configuration if both the setting of the dedicated variable is a close state and the setting of the common variable is a close state, wherein determining that the setting of the dedicated variable and the setting of the common variable are valid configuration if both the setting of the dedicated variable is a close state and the setting of the common variable is the close state is determining that a setting of an HS DSCH RECEPTION CELL FACH STATE variable and a setting of an HS DSCH RECEPTION OF CCCH variable are valid configuration if both a setting of the HS DSCH RECEPTION CELL FACH STATE variable is "FALSE" and a setting of the HS DSCH RECEPTION OF CCCH variable is "FALSE" and wherein determining that the setting of the dedicated variable and the setting of the common variable are the valid configuration comprises maintaining a setting of an INVALID CONFIGURATION variable "FALSE".

6. The communications device of claim 5, wherein the program code further comprises stopping the high speed downlink operation when the setting of the dedicated variable changes from the use state to the close state and the setting of the common variable is the close state.

7. The communications device of claim 5, wherein the high speed downlink operation comprises reception of a high speed downlink shared channel, abbreviated to HS-DSCH.

8. The communications device of claim 5, wherein changing the setting of the dedicated variable from the use state to the close state is changing a setting of an HS_DSCH_RECEPTION_$_{CELL}$_FACH_STATE variable from "TRUE" to "FALSE".

* * * * *